(12) United States Patent
Smavatkul et al.

(10) Patent No.: US 7,492,753 B2
(45) Date of Patent: Feb. 17, 2009

(54) METHOD FOR PERFORMING TRANSACTIONS IN A WIRELESS LOCAL AREA NETWORK

(75) Inventors: Nattavut Smavatkul, Elk Grove Village, IL (US); Ye Chen, Schaumburg, IL (US); Stephen P. Emeott, Rolling Meadows, IL (US); Floyd D. Simpson, Lake Worth, FL (US); Huai Y. Wang, Greenacres, FL (US)

(73) Assignee: Motorola, Inc., Schaumburg, IL (US)

( * ) Notice: Subject to any disclaimer, the term of this patent is extended or adjusted under 35 U.S.C. 154(b) by 425 days.

(21) Appl. No.: 10/789,528

(22) Filed: Feb. 26, 2004

(65) Prior Publication Data
US 2005/0190738 A1 Sep. 1, 2005

Related U.S. Application Data

(60) Provisional application No. 60/449,539, filed on Feb. 21, 2003.

(51) Int. Cl.
*H04J 3/16* (2006.01)

(52) U.S. Cl. .................. 370/346; 370/395.21

(58) Field of Classification Search ............. 370/346, 370/395.21, 445, 449, 349, 503, 487, 490, 370/537, 535
See application file for complete search history.

(56) References Cited

U.S. PATENT DOCUMENTS

| | | | | |
|---|---|---|---|---|
| 6,353,869 | B1 * | 3/2002 | Ofer et al. | 710/200 |
| 6,452,946 | B1 * | 9/2002 | Manzardo | 370/487 |
| 2001/0013543 | A1 * | 8/2001 | Takashima et al. | 235/380 |
| 2005/0135409 | A1 * | 6/2005 | Janczak | 370/449 |

* cited by examiner

*Primary Examiner*—Sam Bhattacharya
(74) *Attorney, Agent, or Firm*—Randall S. Vaas; Scott M. Garrett

(57) ABSTRACT

A mobile terminal (302, 304) wakes up from a low power state and initiates a frame exchange in a wireless local area network that supports voice traffic by transmitting a polling frame (602). If the mobile terminal had voice data to send, it is included in the polling frame. In response to receiving the polling frame, the access point transmits a delay frame (604) to acknowledge receipt of the polling frame. If the access point has data for the polling mobile terminal, it transmits a non-delay frame (606) including the voice data, otherwise it transmits a null frame (702). The mobile terminal acknowledges the data from the access point (608), and goes back to sleep until the beginning of the next service interval.

20 Claims, 6 Drawing Sheets

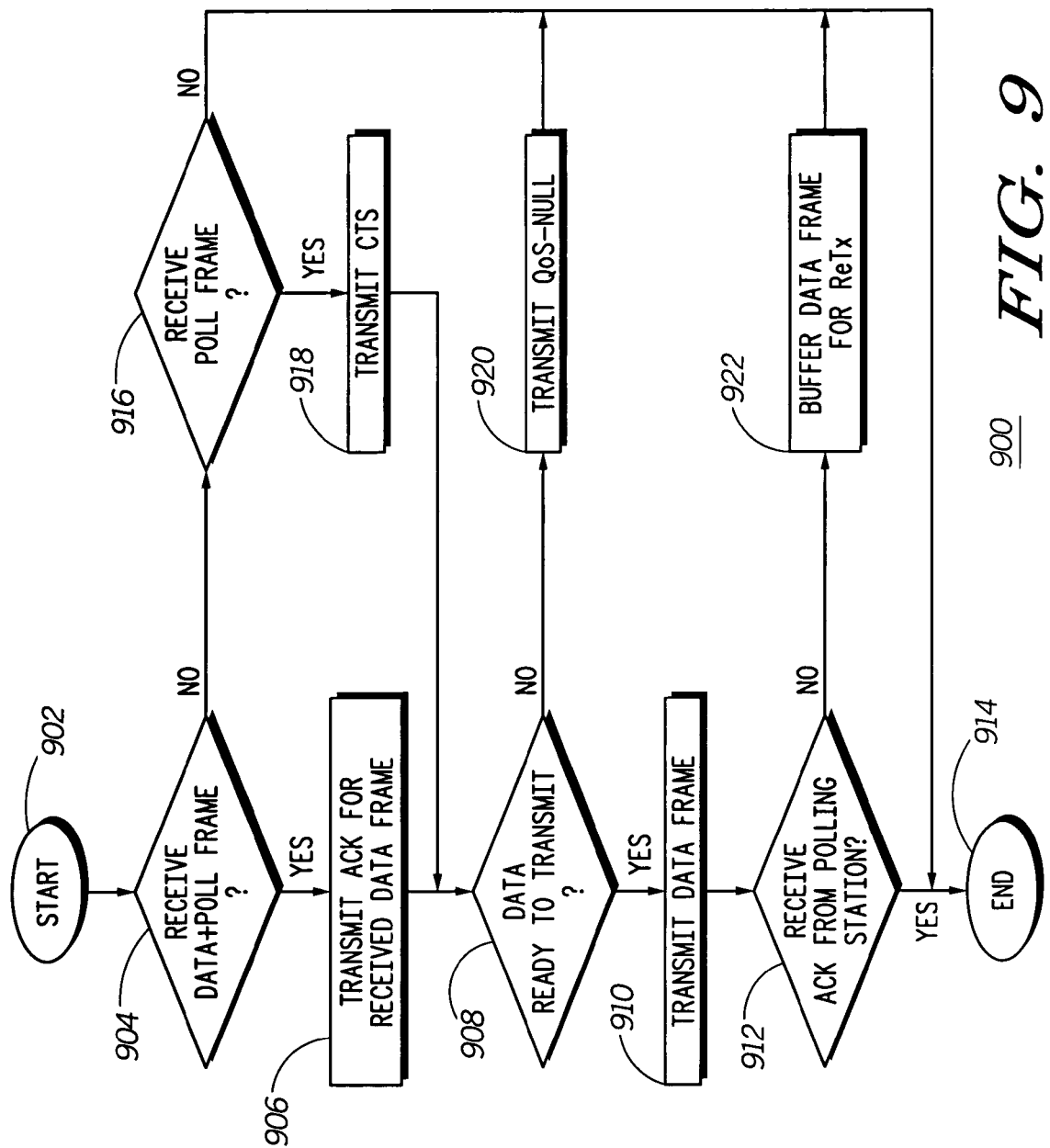

METHOD FOR PERFORMING TRANSACTIONS IN A WIRELESS LOCAL AREA NETWORK

CROSS REFERENCE TO RELATED APPLICATIONS

This application claims the benefit of U.S. Provisional Application No. 60/449,539, filed Feb. 21, 2003 and assigned to Motorola, Inc.

TECHNICAL FIELD

The invention relates generally to the field of communications, and more particularly to a method of transmitting traffic between an access point and a plurality of portable devices.

BACKGROUND OF THE INVENTION

Generally, wireless local area networking (WLAN) devices must support two channel access methods, namely, contention-based access and polling driven access. Contention based access allows any wireless terminal or access point to capture the channel and transmit a data frame after monitoring the channel in accordance with carrier sensing procedures. When using the polling driven access procedure, on the other hand, all frame exchanges are initiated by an access point, either through a polling signal or by simply transmitting data from the access point to one of a plurality of stations. Either contention based or polling driven access techniques may be used to transport voice traffic between an access point and a plurality of wireless terminals, and extensions to both techniques are available to provide service differentiation between voice and data traffic classes sharing a single WLAN channel. However, the frame exchange sequences defined by both procedures are inefficient when used to deliver voice traffic between an access point and a plurality of stations. Additionally, neither technique offers adequate support for power savings operations in a wireless terminal that is transmitting and receiving voice traffic.

ANSI/IEEE Standard 802.11, 1999 Edition (hereinafter "the 802.11 standard"), defines two different methods of accessing the channel. Section 9.3 of the 802.11 standard defines a polling-based contention-free access method. Section 9.2 of the 802.11 standard defines a carrier sensing contention-based access method.

The WLAN frame exchange sequence using the contention-free access method is illustrated in FIG. 1. Under this method, a communication device such as a mobile terminal (MT), wakes up prior to each beacon transmission and waits to be polled by the access point (AP). The duration between transmission of the beacon and receipt of a polling message at a particular MT can depend on the loading level of the network as well as the scheduling algorithm at the AP. Along with the polling message, the AP also transmits a downlink voice packet. Then, the MT responds with an acknowledgement (ACK) to the downlink voice packet and an uplink voice packet destined to the AP. Upon successful reception of the ACK and uplink voice packet, the AP acknowledges the successful reception by sending an acknowledgement message to the MT. Following a successful frame exchange sequence, the MT can stop monitoring the channel and turn off its radio transceiver. It should wake up again to receive the next beacon transmission. Because the frame exchange sequence depicted in FIG. 1 has to be initiated by the AP, the MT has to be alert at all times waiting for the initiation. This causes a power drain on the MT's battery, which on average, is proportional to the number of MTs on the polling list for a particular AP.

FIG. 2 shows a prior art method 200 of polling in a wireless local area network. The method illustrated in FIG. 2 is similar to the method illustrated in FIG. 1, except that the initial poll frame 202 does not contain any data, and is only a polling frame. In this instances, the polling station seeks to receive data from the polled station, here the MT. In response to the polling frame, after a short interframe space (SIFS) time period 204, the polled station sends a data packet 206 to the polling station. After another SIFS 208, the polling station acknowledges receipt of the data by sending an acknowledgment frame 210.

The problem with the prior art method of polling is that it is driven by the AP, and requires the MT to remain on for long periods, which consumes significant battery life. One solution to this is to let the mobile terminals control polling, as is described in pending U.S patent application No. 60/421490, filed Oct. 25, 2002, titled "Method Of Communication Device Initiated Frame Exchange," and assigned to the assignee of the present application, the disclosure of which is hereby incorporated by reference. While allowing the mobile terminals to control polling could allow for better management of power consumption, it has been found that many access point controllers cannot respond fast enough because the AP must locate data for the MT, place it in a transmit buffer, and then transmit it. Since a SIFS time period is on the order of 9 to 20 microseconds, AP equipment is not always able to respond in time. Therefore, there is a need whereby a mobile terminal can power down for longer periods, but allow an AP time to respond to a polling frame.

BRIEF DESCRIPTION OF THE DRAWINGS

FIG. 9 shows a flow chart diagram for a method of performing a network transaction in a wireless local area network at a polled station, in accordance with the invention.

DETAILED DESCRIPTION OF A PREFERRED EMBODIMENT

Figure 1:
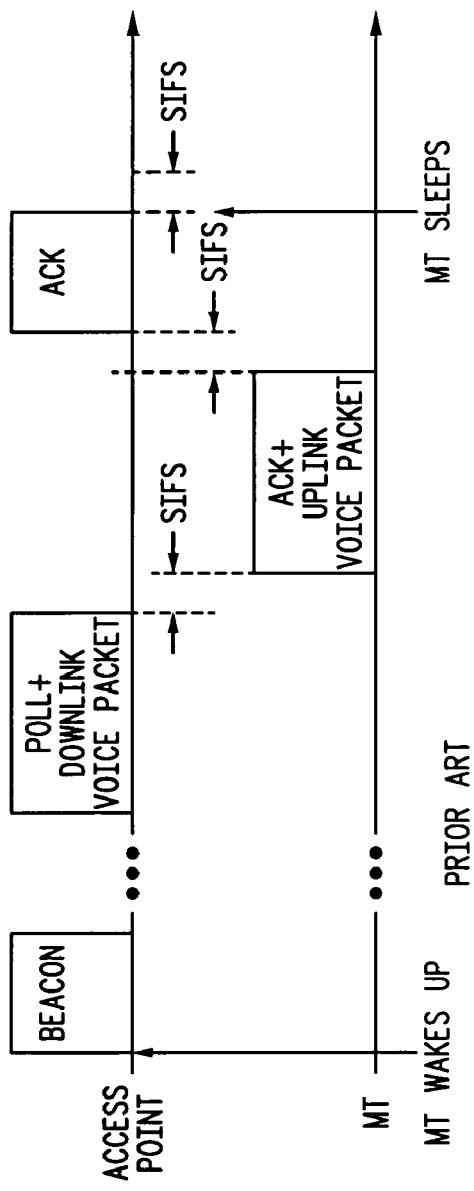
FIG. 1 shows a WLAN frame exchange sequence using the contention-free access method in accordance with the prior art.
Figure 2:
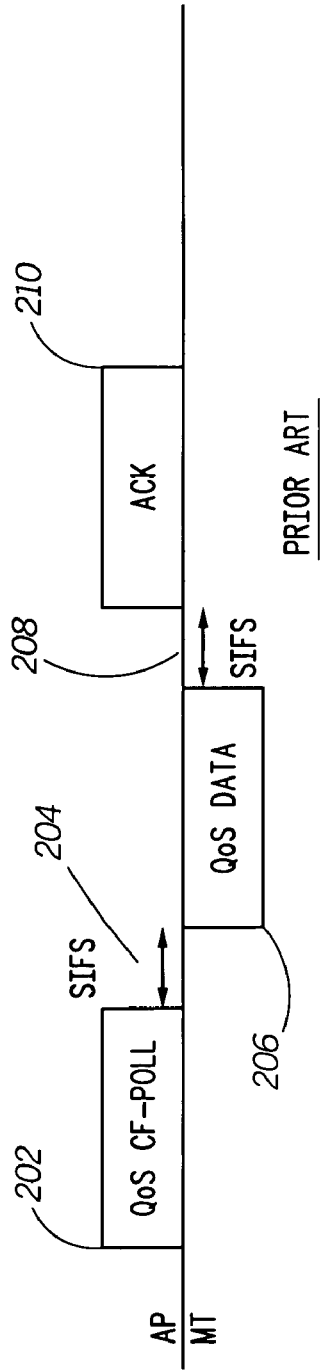
FIG. 2 shows a prior art method of polling in a wireless local area network.

While the specification concludes with claims defining the features of the invention that are regarded as novel, it is believed that the invention will be better understood from a consideration of the following description in conjunction with the drawing figures, in which like reference numerals are carried forward.

The invention solves the problem of slow access point response by allowing the access point to send at least one delay frame, followed by a non-delay frame. In the time it takes to transmit the delay frame, the access point equipment can buffer any data it has to send to the mobile terminal and send it after the delay frame. If no data is present to send to the mobile terminal, then the access point sends a null frame, indicating to the mobile terminal that no data was present.

Figure 3:
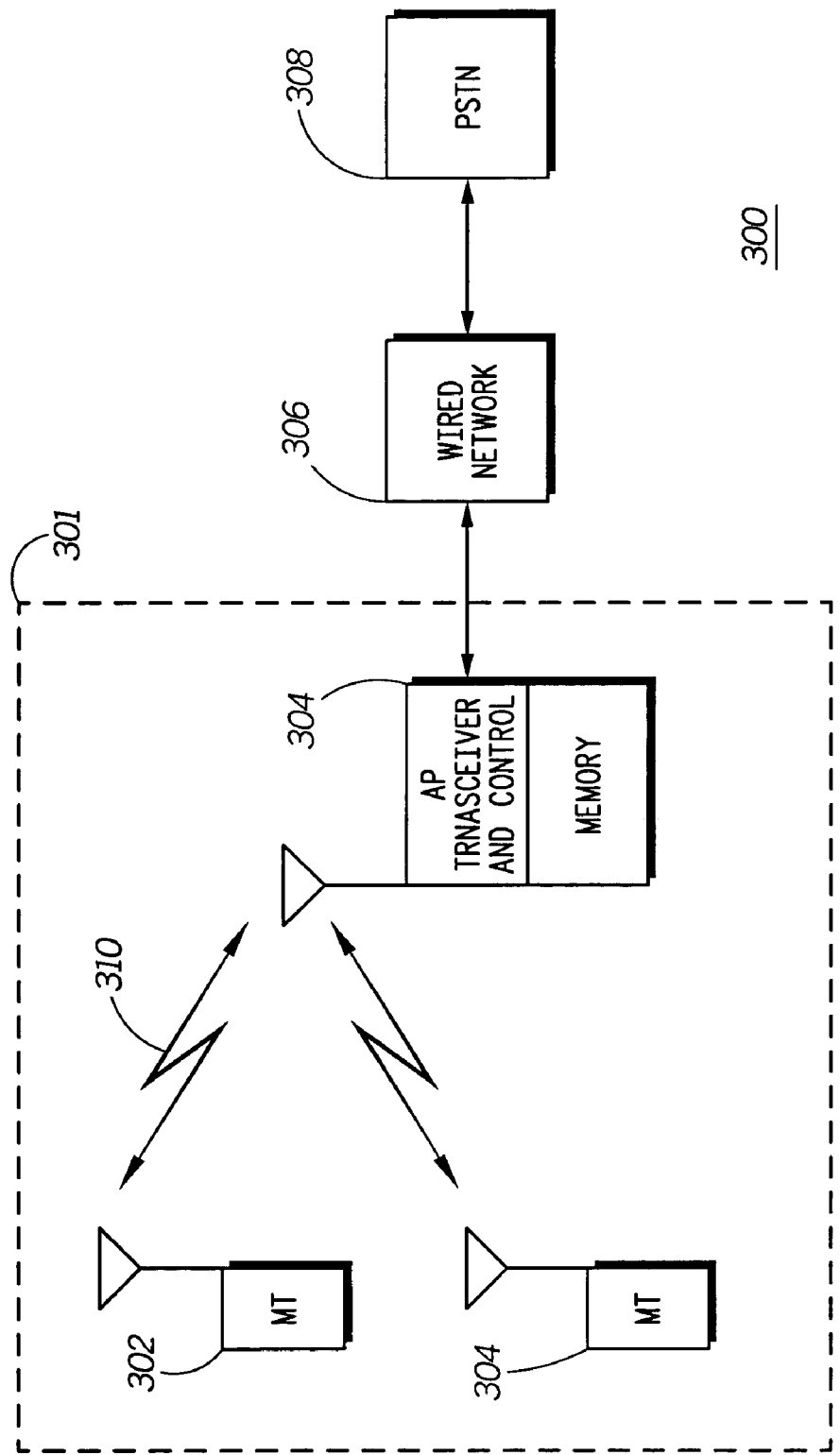
FIG. 3 shows a block diagram of a system that can be used to implement the communication device initiated frame exchange method of the present invention.

Referring now to FIG. 3, there is shown a block diagram 300 of a system that can be used to implement the communication device initiated frame exchange method of the present invention. To support telephony voice over a wireless local area network (WLAN) 301, the access point (AP) 304 must be able to exchange voice frames with a plurality of mobile terminals (MT) 302, 303, as shown in FIG. 3. The voice frames generated by the MTs 302, 303, and destined to the AP 304, are referred to herein as uplink traffic. Additionally, the voice frames arriving from the network 306 (based on voice traffic from a public switched telephone network (PSTN) 308, for example) and destined to the MT 302, 303 is referred to herein as downlink traffic. The AP 304 has a memory 305 for storing voice frames received from the wired network until the particular MT for which they are bound polls the AP. Under the present invention, the MTs 302, 303 associate themselves with a nearby AP 304, and exchange voice frames with the AP 304. According to the preferred embodiment of the invention, the mobile terminals share the channel 310, and control polling.

In the present invention, the inter-arrival time between voice packets is related to a service interval. In particular, a service interval is defined as the average inter-arrival time between voice frames comprising either uplink or downlink traffic. Generally, a wireless station 302, 303 or a voice gateway in the network 306 generates one voice frame per service interval, just prior to an expected packet arrival time. The expected packet arrival time for voice frame N+1 is the expected packet arrival time for voice frame N plus the length of the service interval. While the actual arrival time of packets can vary, due to variable processing loads or network delays, the service interval remains constant, and is based on the frame interval of the voice coder or vocoder utilized at each side of the wireless call. The expected arrival time, however, is generally unique for each of a plurality of MTs.

Figure 4:
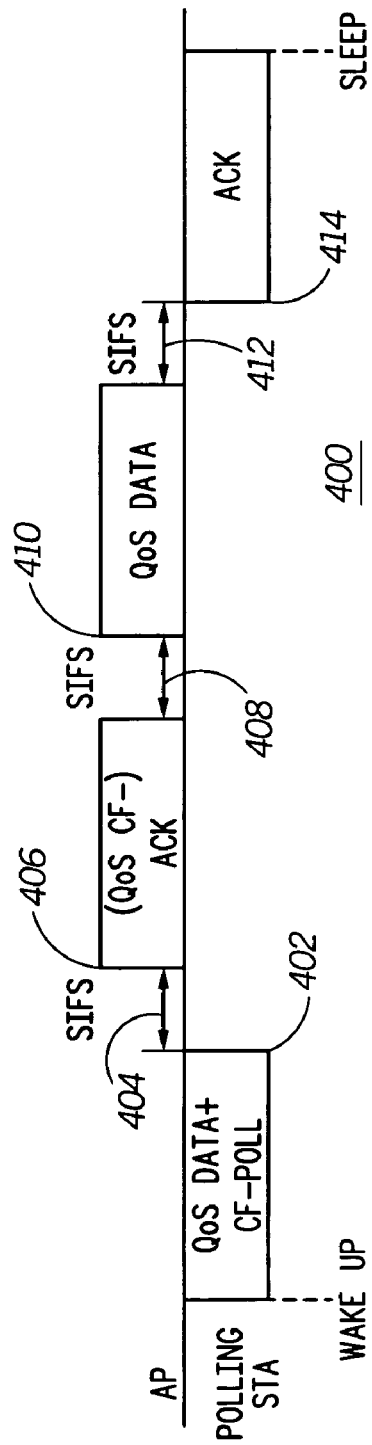
FIG. 4 shows a signal flow diagram of a first embodiment of a method for performing a network transaction in a wireless local area network, in accordance with the invention.
Figure 5:
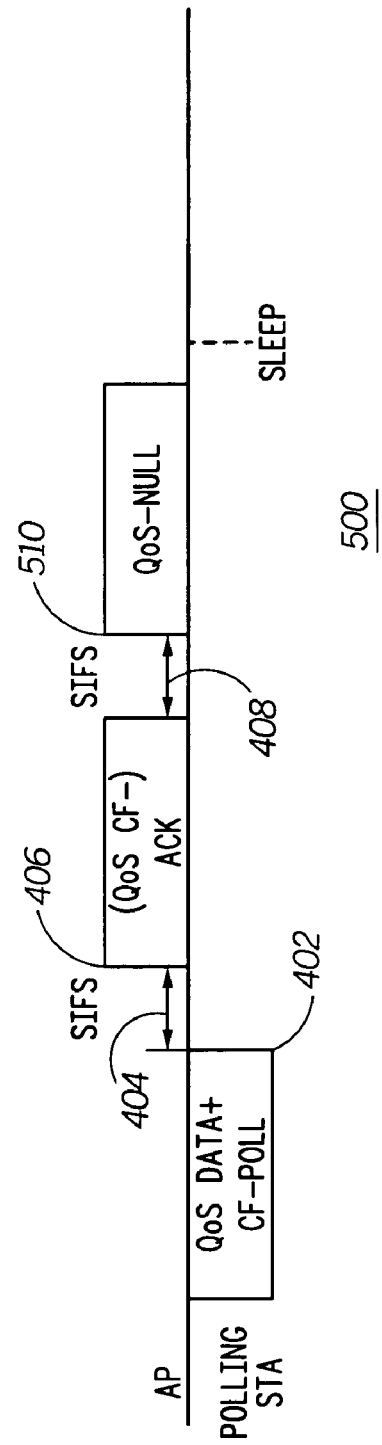
FIG. 5 shows a signal flow diagram of a second embodiment of a method for performing a network transaction in a wireless local area network, in accordance wit the invention.

Referring now to FIG. 4, there is shown a signal flow diagram 400 of a first embodiment of a method for performing a network transaction in a wireless local area network, in accordance with the invention. While, according to the preferred embodiment, the polling station is the mobile terminal and the polled station is the access point equipment, it is contemplated that the method may be used with the access point as the polling station and the mobile terminal being the polled station. The polling station MT commences the procedure by waking up and sending a polling frame 402 to the access point after successfully acquiring the channel. The polling frame here includes a data packet, such as voice data or a voice frame, which is sometimes referred to as a quality of service (QoS) data packet because the AP has reserved certain resources to maintain a voice-quality link, as is known in the art. After a first SIFS interval 404 the polled station, here the access point equipment, responds with a delay frame 406. Since the AP may not be able to determine if it has data available to send to the polling station, the polled station merely transmits an acknowledgement in the first delay frame to indicate receipt of the data packet transmitted by the polling station in the polling frame 402. After a second SIFS interval 408, the polled station has had time to load data to be sent to the polling station, and sends a non-delay frame 410 including a data packet, such as voice data or a voice frame. After a third SIFS interval 412, the polling station acknowledges receipt of the data by transmitting an acknowledgement 414. Subsequent to sending the acknowledgment frame, the polling station, if a mobile terminal, may go back to low power mode, or sleep. In some slower stations, more than one delay frame may be necessary before sending the non-delay frame. The non-delay frame indicates to the polling station that no more transmission will be coming from the polled station for the present transaction cycle. Referring now to FIG. 5, there is shown a signal flow diagram 500 of a second embodiment of a method for performing a network transaction in a wireless local area network, in accordance with the invention. Here the method is the same as that shown in FIG. 4, except that the polled station has no data to transmit to the polling station, so the non-delay frame sent is a null frame 502. When the non-delay frame is a null frame, the mobile terminal enters sleep mode after receiving the null frame.

Figure 6:
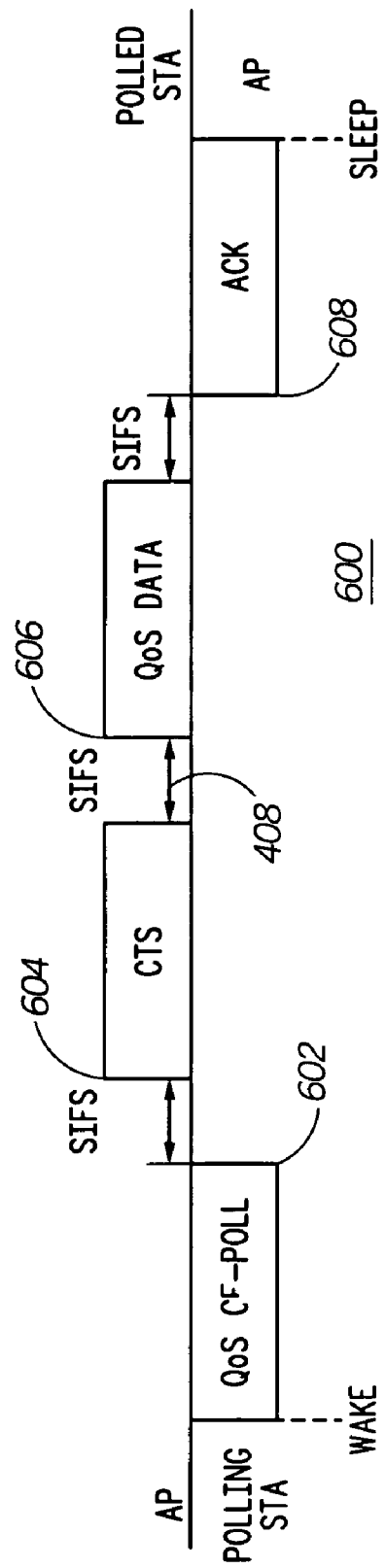
FIG. 6 shows a signal flow diagram of a third embodiment of a method for performing a network transaction in a wireless local area network, in accordance with the invention.
Figure 7:
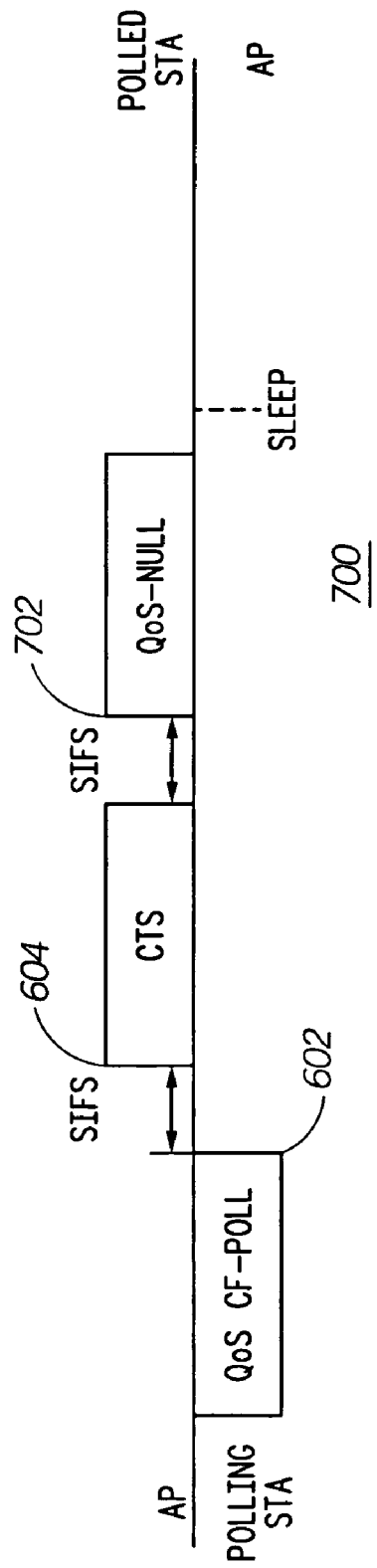
FIG. 7 shows a signal flow diagram of a fourth embodiment of a method for performing a network transaction in a wireless local area network, in accordance with the invention.

Referring now to FIG. 6, there is shown a signal flow diagram 600 of a third embodiment of a method for performing a network transaction in a wireless local area network, in accordance with the invention. In this instance the polling station has no data to send in the polling frame 602 after waking up from low power mode. Since no data was sent, the delay frame 604 does not contain an acknowledgement. Instead the polled station may send a clear to send frame for the delay frame. In the preferred embodiment, the non-acknowledgement delay frame is sent by the polled station to itself. That is, the media access control (MAC) address used in the frame corresponds to the polled station. The polling station will receive the delay frame, but upon reading the MAC address, it will ignore it. In this instance the polled station has data to send to the polling station and does so in a non-delay frame 606, which is acknowledged with an acknowledgement frame 608 by the polling station. Subsequent to the acknowledgement frame, the mobile terminal may go back to sleep. FIG. 7 shows a signal flow diagram 700 of a fourth embodiment of a method for performing a network transaction in a wireless local area network, in accordance with the invention. Here the polled station has no data to send, so the non-delay frame sent subsequent to the delay frame is a null frame 702. As before, after receiving the null frame the mobile terminal can go back into sleep mode.

Figure 8:
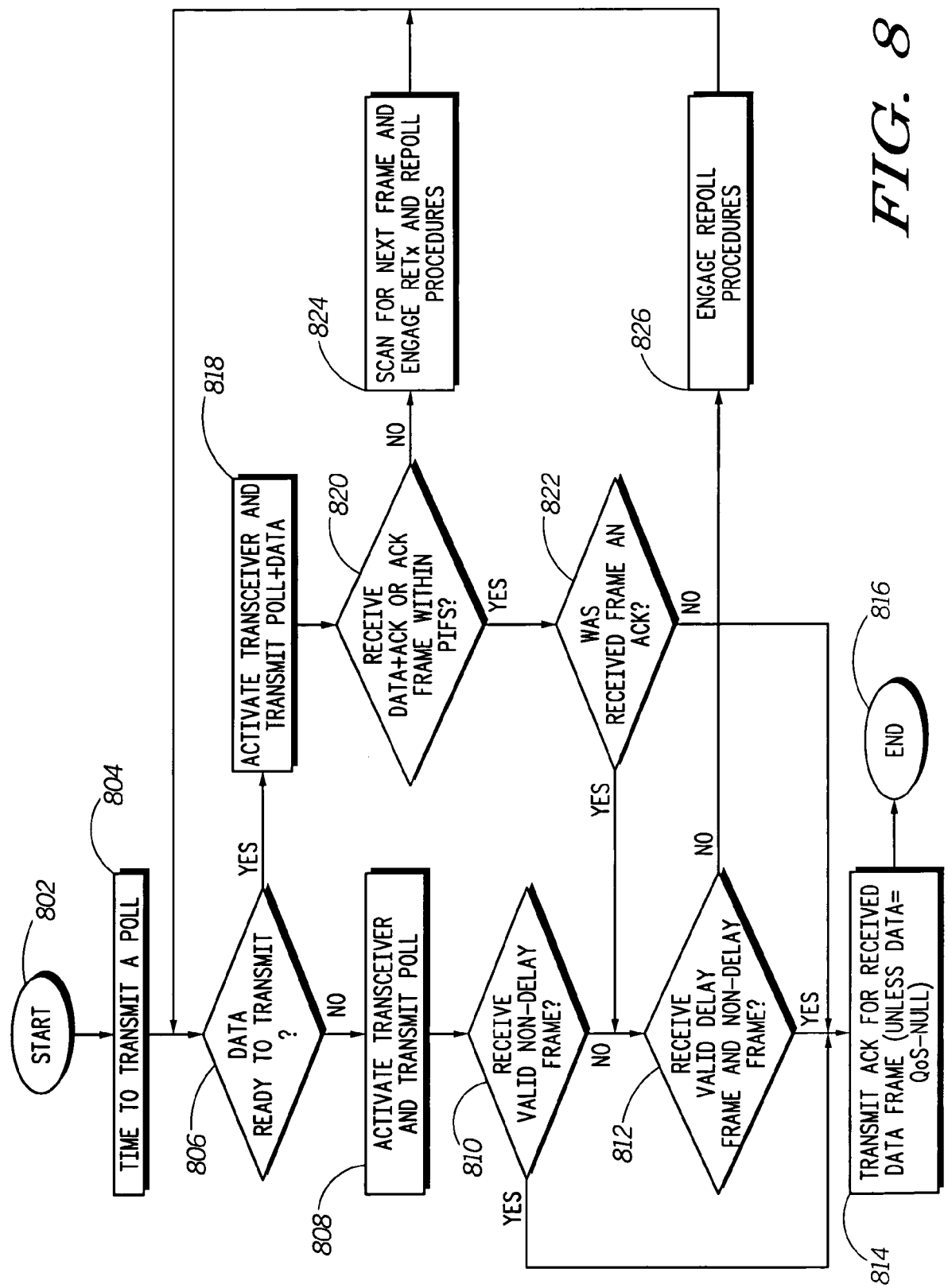
FIG. 8 shows a flowchart diagram of a method of performing a network transaction in a wireless local area network, in accordance with the invention.

Referring now to FIG. 8, there is shown a flowchart diagram 800 of a method of performing a network transaction in a wireless local area network, in accordance with one embodiment of the invention. At the start 802, the mobile terminal and access point have set up a call, which means there is a voice circuit established to the public switched telephone network from the access point over which the user of the mobile terminal may communicate with another party. During call set-up, the access point may indicate the number of delay frames it will transmit in response to a polling frame so the polling stations can anticipate when the non-delay frames may be sent. According to the invention, the mobile terminal is initially in a low power mode to conserve power. While in the low power mode, the mobile terminal is not able to transmit or receive information because critical hardware components have been turned off so as not to consume power. When the time comes to transmit a poll (804), the mobile terminal must wake up its wireless local area network components by turning tern on. The first thing the MT must do after waking up the wireless local area network circuitry is determining if there is data to send (806). If the user of the MT has been speaking, the speech signal will have been voice encoded, or vocoded, and the voice data will be buffered in an outbound or uplink memory of the MT. as is known in the art. If there is no voice data present to transmit the MT sends or transmits & polling frame (808). After transmitting the polling frame, the polled station will send at least one delay frame. While the polling station will receive the delay frame or frames at the physical layer, no data such as voice data is actually received in the sense of passing data from the receiver to other parts of the poling station. If the polled station is fast enough, it may reply without having to send a delay frame, and the polling station may receive a valid non-delay frame (810) in response to the polling frame. The non-delay frame may be a data frame if the polled station has data to transmit to the polling station, or it may be a null frame. If the polled station is slower and requires at least one delay frame to load and send data, as anticipated by the invention, ten the polling station will receive the delay frame and non-delay frame (812). Once the polling station has finished receiving, if it received a data packet or data frame, then the polling station sends an acknowledgement frame (814). If the polled station had no data to send, then no acknowledgement needs to be sent. At this point the transaction is complete (816) and the mobile terminal can put the WLAN hardware back in low power mode.

If, upon waking up, the polling station does have data to transmit, the polling station sends the data in the polling frame (818). If the Foiled station is fast enough, and has data to transmit, it will transmit both an acknowledgement and a data frame (820). if the polled station n: slower, and requires at least one delay frame, the polled station will transmit an acknowledgment frame (822) which acts as a delay frame. After receiving the acknowledgement, the polling station then receives any other delay frames, and a non-delay frame (812). If the non-delay frame included data, ten the polling station sends an acknowledgement frame (814). After sending the acknowledgment frame, or if the non-delay frame was a null frame, then the polling station goes back to sleep (816). It after sending the polling frame with data, the polling station does not receive an acknowledgement frame within an expected period of time, the polling station. commences resend and repoll procedures (824). If polling station does receive a valid delay frame, but fails to receive a non-delay frame within an expected period of time, the polling station commences repolling procedures (826). if the polled station does not receive data in the polling frame (916), then the polled station sends a delay frame such as a clear to send (CTS) frame, as described hereinabove. Then, as before, the polled station checks to see if data needs to be transmitted to the polling station, and commences as before if so. When there is no data to be sent to the polling station, the non-delay frame sent is a null frame (920). If the polled station did send data to the polling station, but does not receive an acknowledgement from the polling station, the polled station buffers the data for retransmission (922). If possible, the polled station will retransmit the data in the present cycle time frame, but if time has expired, and the polling station is required to cede the channel, the polled station may retain the data in a buffer for quick transmission in the next transaction, in addition to other data, if any other data arrives at the polled station, While the preferred embodiments of the invention have been illustrated and described, it will be clear that the invention is not so limited. Numerous modifications, changes, variations, substitutions and equivalents will occur to those skilled in the art without departing from the spirit and scope of the present invention as defined by the appended claims.

What is claimed is:

1. A method for a mobile terminal to perform a network transaction in a wireless local area network that includes a wireless access point, the method comprising:
   awaking from a low power mode;
   sending a polling frame to the access point after awaking from the low power mode;
   receiving at least one delay frame from the access point in response to the polling frame
   temporarily ceasing a procedure for repolling the access point responsive to receiving the at least one delay frame;
   subsequent to receiving the at least one delay frame and temporarily ceasing the procedure for repolling the access point, receiving a non-delay frame from the access point in further response to the polling frame; and
   returning to the low power mode after receiving the non-delay frame.

2. The method of claim 1, wherein the polling frame includes a data packet.

3. The method of claim 2, wherein the at least one delay frame includes an acknowledgment indicating receipt of the data packet.

4. The method of claim 1, wherein the non-delay frame includes a data packet.

5. The method of claim 4, further comprising:
   after receiving the data packet and before returning to the low power mode, transmitting an acknowledgment to the access point indicating receipt of the data packet.

6. The method of claim 2, wherein the data packet is a quality of service data packet.

7. The method of claim 1, wherein the polling frame excludes a data packet.

8. The method of claim 1, further comprising:
   during an initial call set up with the access point, receiving from the access point an indication of the number of delay frames to be sent by the access point during the network transaction.

9. The method of claim 1, wherein the non-delay frame includes a null frame.

10. The method of claim 1, wherein the at least one delay frame includes a media access control address identifying the access point as an intended target of the at least one delay frame.

11. A method for a wireless access point to perform a network transaction in a wireless local area network that includes at least one mobile terminal, the method comprising:
    receiving a polling frame from a mobile terminal;
    sending at least one delay frame to the mobile terminal in response to receiving the polling frame, the at least one delay frame effecting a temporary cessation of a procedure at the mobile terminal for repolling the access point; and
    subsequent to sending the at least one delay frame and prior to receiving another polling frame from the mobile terminal, sending a non-delay frame to the mobile terminal in further response to the polling frame.

12. The method of claim 11, wherein the polling frame includes a quality of service data packet.

13. The method of claim 12, wherein the at least one delay frame includes an acknowledgment indicating receipt of the data packet.

14. The method of claim 11, wherein the non-delay frame includes a data packet.

15. The method of claim 14, further comprising:
after sending the data packet, receiving an acknowledgment from the mobile terminal indicating that the mobile terminal received the data packet.

16. The method of claim 11, wherein the polling frame excludes a data packet.

17. The method of claim 11, further comprising:
during an initial call set up with the mobile terminal, sending to the mobile terminal an indication of the number of delay frames to be sent to the mobile terminal during the network transaction.

18. The method of claim 11, wherein the non-delay frame includes a null frame.

19. The method of claim 11, wherein the at least one delay frame includes a media access control address identifying the access point as an intended target of the at least one delay frame.

20. A method for performing a network transaction in a wireless local area network that includes a first wireless station and a second wireless station, the method comprising:

awaking, by the first wireless station, from a low power mode;

sending, by the first wireless station, a polling frame to the second wireless station after awaking from the low power mode;

receiving, by the first wireless station, at least one delay frame from the second wireless station in response to the polling frame;

temporarily ceasing, by the first wireless station, a procedure for repolling the second wireless station responsive to receiving the at least one delay frame;

subsequent to receiving the at least one delay frame and temporarily ceasing the procedure for repolling the second wireless station, receiving, by the first wireless station, a non-delay frame from the second wireless station in further response to the polling frame; and returning, by the first wireless station, to the low power mode after receiving the non-delay frame.

* * * * *